US009276844B2

(12) United States Patent
Thubert et al.

(10) Patent No.: US 9,276,844 B2
(45) Date of Patent: Mar. 1, 2016

(54) DISTRIBUTED MEDIA ACCESS CONTROLLER TRANSMITTING NETWORK CODED CELLS VIA OPTICAL TRANSMITTERS

(71) Applicant: Cisco Technology, Inc., San Jose, CA (US)

(72) Inventors: Pascal Thubert, La Colle sur Loup (FR); Charles Calvin Byers, Wheaton, IL (US); Douglas Chan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/230,034

(22) Filed: Mar. 31, 2014

(65) Prior Publication Data

US 2015/0281057 A1  Oct. 1, 2015

(51) Int. Cl.
*H04L 12/721* (2013.01)
*H04L 29/06* (2006.01)
*H04B 10/27* (2013.01)
*H04B 10/50* (2013.01)
*H04B 10/114* (2013.01)
*H04B 10/116* (2013.01)

(52) U.S. Cl.
CPC .............. *H04L 45/66* (2013.01); *H04B 10/116* (2013.01); *H04B 10/1149* (2013.01); *H04B 10/27* (2013.01); *H04B 10/502* (2013.01); *H04L 69/22* (2013.01)

(58) Field of Classification Search
CPC ........ H04L 45/66; H04L 69/22; H04B 10/27; H04B 10/502
USPC .............................. 398/43, 118, 127, 128, 172
See application file for complete search history.

(56) References Cited

U.S. PATENT DOCUMENTS

| | | | |
|---|---|---|---|
| 8,271,687 B2 | 9/2012 | Turner et al. | |
| 8,620,163 B1 | 12/2013 | Sleator | |
| 2008/0181614 A1 | 7/2008 | Ann | |
| 2008/0219368 A1* | 9/2008 | Watanabe | 375/260 |
| 2010/0046542 A1* | 2/2010 | van Zelst et al. | 370/465 |
| 2012/0008959 A1 | 1/2012 | Son et al. | |
| 2012/0155889 A1 | 6/2012 | Kim et al. | |
| 2012/0224860 A1 | 9/2012 | Kim et al. | |
| 2012/0327983 A1* | 12/2012 | Nakajima | 375/219 |
| 2014/0161456 A1* | 6/2014 | Sugawa et al. | 398/72 |

OTHER PUBLICATIONS

Brodkin, "A wireless network with frickin' laser beams on the ceiling", [online]. May 9, 2013. [retrieved on Apr. 9, 2014]. Retrieved from the Internet: <URL: http://arstechnica.com/information-technology/2013/051a-wireless-network-with-frickin-laser-beams-on-the-ceiling/>, pp. 1-6.

(Continued)

*Primary Examiner* — Dalzid Singh
(74) *Attorney, Agent, or Firm* — Leon R. Turkevich

(57) ABSTRACT

In one embodiment, a method comprises receiving, by an apparatus, a Media Access Control (MAC) frame destined for a destination device; dividing, by the apparatus, the MAC frame into frame fragments; coding the frame fragments into encoded cells; and causing, by the apparatus, transmission of selected subsets of the encoded cells, as distinct flows of the encoded cells, by respective optical physical layer transmitter devices reachable by the destination device.

20 Claims, 5 Drawing Sheets

(56) References Cited

OTHER PUBLICATIONS

Canon, "Canobeam", [online]. [retrieved on Feb. 7, 2014]. Retrieved from the Internet: <URL: http://www.canon.com/bctv/canobeam/>, 2 pages.

"Scientists Use LED Light Bulbs to Make 800Mbps Capable Wireless Network", [online]. Aug. 2, 2011. [retrieved on Mar. 5, 2014]. Retrieved from the Internet: <URL: http://www.ispreview.co.uk/story/2011/08/02/scientists-use-led-light-bulbs-to-make-800mbps-capable-wireless-network.html>, pp. 1-3.

Thinniyam et al., "Network Coding in Optical Networks with O/E/O Based Wavelength Conversion", [online]. 2010 [retrieved on Feb. 7, 2014]. Retrieved from the Internet: <URL: http://www.mit.edu/~medard/mpapers/OFCpaper2010.pdf>, 3 pages.

Ted, "Harald Haas: Wireless data from every light bulb", [online]. 2011. [retrieved on Feb. 7, 2014]. Retrieved from the Internet: <URL: http://www.ted.com/talks/harald_haas_wireless_data_from_every_light_bulb.html>, pp. 1-35.

Byers, U.S. Appl. No. 14/095,247, filed Dec. 3, 2013.

Byers et al., U.S. Appl. No. 14/031,853, filed Sep. 19, 2013.

\* cited by examiner

US 9,276,844 B2

DISTRIBUTED MEDIA ACCESS CONTROLLER TRANSMITTING NETWORK CODED CELLS VIA OPTICAL TRANSMITTERS

TECHNICAL FIELD

The present disclosure generally relates to a media access controller transmitting data via optical transmitters in a data network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Optical networks have been proposed for propagation of data packets via optical beams output by optical transmitters such as lasers or light bulbs employing Light Emitting Diodes (LEDs).

Network coding is a technique of in-network re-coding of source packets for distribution among network elements. Network coding can provide more robust reception of data packets in lossy networks where not all of transmitted data packets are received by a receiving network element.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
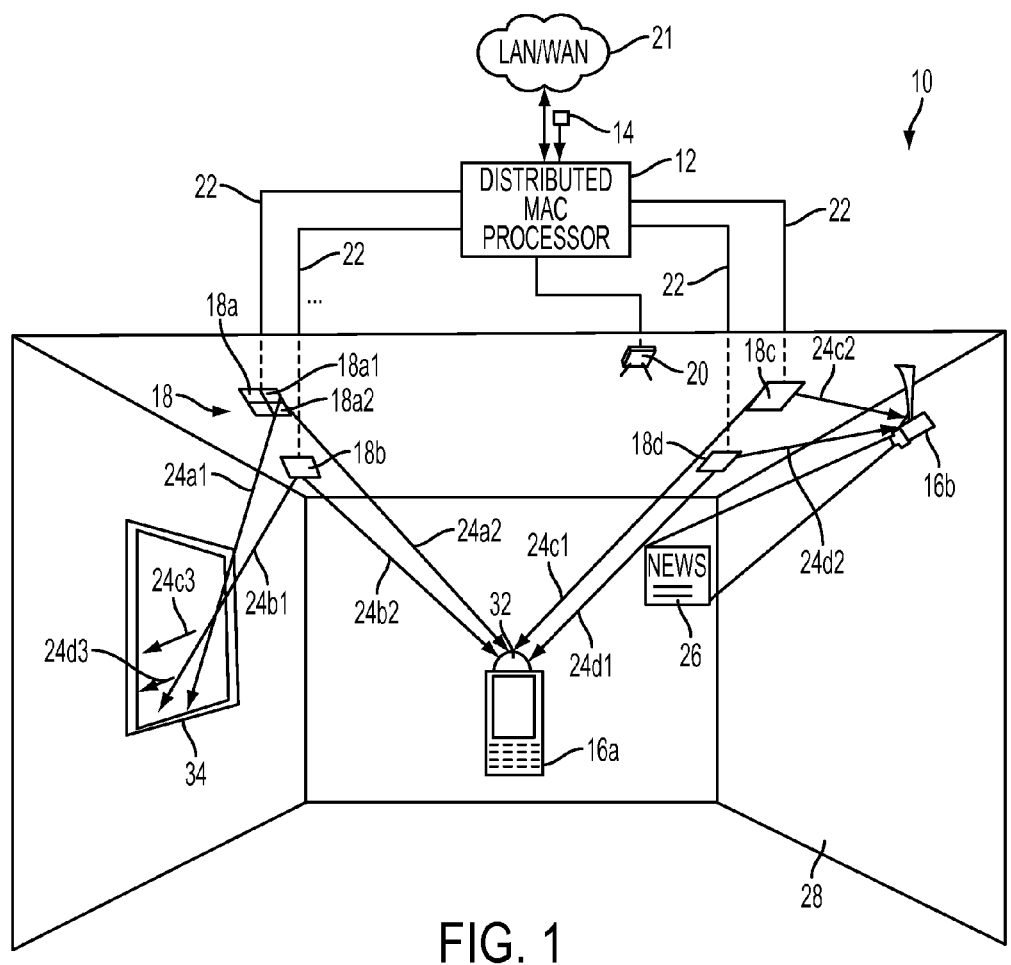
FIG. 1 illustrates an example system having an apparatus for controlling transmission of a media access control (MAC) frame to a destination device as network coded cells via multiple optical transmitters, according to an example embodiment.

In one embodiment, a method comprises receiving, by an apparatus, a Media Access Control (MAC) frame destined for a destination device; dividing, by the apparatus, the MAC frame into frame fragments; coding the frame fragments into encoded cells; and causing, by the apparatus, transmission of selected subsets of the encoded cells, as distinct flows of the encoded cells, by respective optical physical layer transmitter devices reachable by the destination device.

In another embodiment, an apparatus comprises a network interface circuit and a processor circuit. The network interface circuit is configured for receiving a Media Access Control (MAC) frame destined for a destination device. The processor circuit is configured for dividing the MAC frame into frame fragments, coding the frame fragments into encoded cells, and causing transmission of selected subsets of the encoded cells, as distinct flows of the encoded cells, by respective optical physical layer transmitter devices reachable by the destination device.

In another embodiment, logic is encoded in one or more non-transitory tangible media for execution by a machine and when executed by the machine operable for: receiving, by the machine, a Media Access Control (MAC) frame destined for a destination device; dividing, by the machine, the MAC frame into frame fragments; coding the frame fragments into encoded cells; and causing, by the machine, transmission of selected subsets of the encoded cells, as distinct flows of the encoded cells, by respective optical physical layer transmitter devices reachable by the destination device.

In yet another embodiment, an apparatus comprises a device interface circuit and a processor circuit. The device interface circuit is configured for receiving at least first and second optical beams transmitting respective distinct flows of encoded cells for a Media Access Control (MAC) frame. The processor circuit is configured for decoding, from the distinct flows of encoded cells, a plurality of MAC frame fragments, and assembling the MAC frame from the frame fragments.

DETAILED DESCRIPTION

Particular embodiments enable a Media Access Control (MAC) frame destined for a destination device to be transmitted via multiple optical physical layer transmitter devices that are reachable by the destination device, without any interference among any of the physical layer transmitter devices. An apparatus can operate as a distributed MAC based on: dividing a received MAC frame (e.g., a "layer 2" data frame such as an IEEE 802 data frame) into frame fragments, coding the frame fragments into encoded cells; and causing transmission of selected subsets of the encoded cells, as distinct flows of the encoded cells, by respective optical physical layer transmitter devices reachable by the destination device. The encoded cells can be generated, for example, using example network coding techniques (e.g., XOR coding, Reed Solomon coding, etc.), to generate the encoded cells.

In one example, the optical physical layer transmitter devices can be implemented as an array of light emitting diode (LED) transmitters and appropriate optical elements, for example LED based light fixtures; the LED based light fixtures can be controlled on a per-LED basis, enabling the apparatus to cause transmission of different distinct flows of encoded cells by the different LED transmitters (e.g., as directional light beams).

A destination device can include a device interface circuit having two or more directional receivers for receiving at least first and second optical beams from the optical physical layer transmitter devices, and a processor circuit configured for decoding the MAC frame fragments from the distinct flows of encoded cells transmitted via the respective first and second optical beams; in particular, the coding enables reconstruction of the frame fragments if a prescribed minimum number of the encoded cells are received by the destination device. Hence, the processor circuit in the destination device is configured for assembling the MAC frame from the frame fragments decoded from the distinct flows of encoded cells.

Hence, the example embodiments can establish a distributed optical access network based on coding frame fragments from a MAC frame, and causing parallel transmission of distinct flows of the encoded cells via two or more optical physical layer transmitter devices reachable by the destination device. The coding of frame fragments enables orthogonal-based coding that prevents interference between the parallel transmission of light beams of optical physical layer transmitter devices; moreover, the coding enables the destination device to reassemble the MAC frame upon receiving a prescribed minimum number of encoded cells, regardless of the order in which the prescribed minimum number of encoded cells are received. Further, an unintended receiver device is unable to decode the MAC frame without the prescribed minimum number of encoded cells.

FIG. 1 illustrates an example network 10 having an apparatus 12 for controlling transmission of a media access control (MAC) frame 14 to a destination device 16 (e.g., 16a and/or 16b) as network coded cells via multiple optical transmitters 18 (e.g., 18a, 18b, 18c, and/or 18d), according to an example embodiment. The apparatus 12 is a physical machine (i.e., a hardware device) configured for implementing network communications with other physical machines 16, 20 via the network 10, for example based on receiving the MAC frame 14 from a local area network (LAN) that can be coupled to a wide area network 21. The apparatus 12 includes connections 22 for outputting distinct flows of encoded cells (e.g., network-coded cells) to each of the optical physical layer transmitter devices 18.

Each optical transmitter 18 (e.g., 18a, 18b, 18c, and/or 18d) can be implemented as a network-enabled light fixture and can include one or more physical layer transmitter devices (e.g., LED devices and associated optical assemblies) configured for outputting a corresponding light beam 24 in a prescribed direction. For example, the optical transmitter 18a can include a first LED transmitter 18a1 configured for outputting a corresponding optical beam 24a1, and a second LED transmitter 18a2 configured for outputting a corresponding optical beam 24a2; the optical transmitter 18b can include a first LED transmitter configured for outputting the corresponding optical beam 24b1, and a second LED transmitter configured for outputting the corresponding optical beam 24b2; the optical transmitter 18c can include first, second, and third LED transmitters configured for outputting the optical beam 24c1, 24c2, and 24c3, respectively; and the optical transmitter 24d can include first, second, and third LED transmitters configured for outputting the optical beams 24d1, 24d2, and 24d3, respectively. Each light beam 24 can have a prescribed beam angle, for example a twenty degree angle, and/or a zero beam angle based on the physical layer transmitter device being implemented as a laser diode that is fixed or movable (e.g., providing a prescribed angular deflection over time to "scan" a secure area 28). Depending on implementation, the apparatus 12 can include a device interface circuit (44 of FIG. 2) that can include LED drivers for each corresponding LED (e.g., 18a1); alternately, the device interface circuit of the apparatus 12 can communicate with a controller in each optical transmitter 18 for transmission of distinct flows of encoded cells, described below.

According to example embodiments, the apparatus 12 can cause each optical physical layer transmitter device (e.g., an LED device) to transmit a corresponding and distinct flow of encoded cells on a corresponding light beam (e.g., 24a2) for reception by a destination device 16 (e.g., 16a, 16b). Hence, the apparatus 12 enables a destination device 16a and/or 16b to receive multiple distinct flows of encoded cells via respective light beams 24: as illustrated in FIG. 1, the destination device 16a (e.g., a portable client device such as an optical-enabled smartphone) can receive first, second, third, and fourth distinct flows of encoded cells (e.g., for a unicast stream of data packets) via respective light beams 24a2, 24b2, 24c1, and 24d1; the destination device 16b (e.g., an optical-enabled projector configured for projecting a video image 26) can receive first and second distinct flows of encoded cells (e.g., for a multicast stream of data packets) via respective light beams 24c2 and 24d2.

As described in further detail below, the transmission of multiple distinct flows of encoded cells by respective physical layer transmitter devices (e.g., 18a) enables each destination device 16 to receive multiple high-bandwidth (e.g., broadband) light beams, where the entire volume of a secure area 28 (e.g., an enclosed room) can be "bathed" or "covered" with numerous light beams 24 (e.g., a "light sprinkler"), each having a distinct flow of encoded cells that does not interfere with any other flow of encoded cells. Hence, the aggregate bandwidth of a few hundred light fixtures in a large room can exceed tens of terabytes per second (two orders of magnitude higher than the typical wireless capacity of a wireless access point 20), enabling multiple broadband data streams (e.g., video data streams) to be transmitted wirelessly to different user destination devices 16 in the secure area 28.

As described in further detail below, the apparatus 12 also can manage the distribution of data streams via the optical physical layer transmitter devices 18 (arranged, for example as an array in the secure area 28), based on identifying the optical physical layer transmitter devices that are reachable (i.e., detectable) by the destination device 16 from among the array of optical physical layer transmitter devices 18, and sending the distinct flows to the respective optical physical layer transmitter devices 18 identified as reachable by the destination device 16 (and not to any optical physical layer transmitter devices 18 that are not reachable by the destination device 16). Hence, the transmission of flows of encoded cells associated with a given data stream can be isolated to a particular portion (i.e., subset area) of a secure area 28, based on the relative position of the destination device 16 within the secure area. As described below, a destination device 16 can send to the apparatus 12 (e.g., via the wireless WiFi access point 20) a list of transmitter identifiers detected by the destination device 16, enabling the apparatus 12 to identify the physical layer transmitter devices 18 reachable by the destination device 16; any changes in the list of detected transmitters 18 over time enables the apparatus 12 to detect movement by the destination device 16 (and detect the approximate position of the destination device 16) within the secure area 28.

Figure 2:
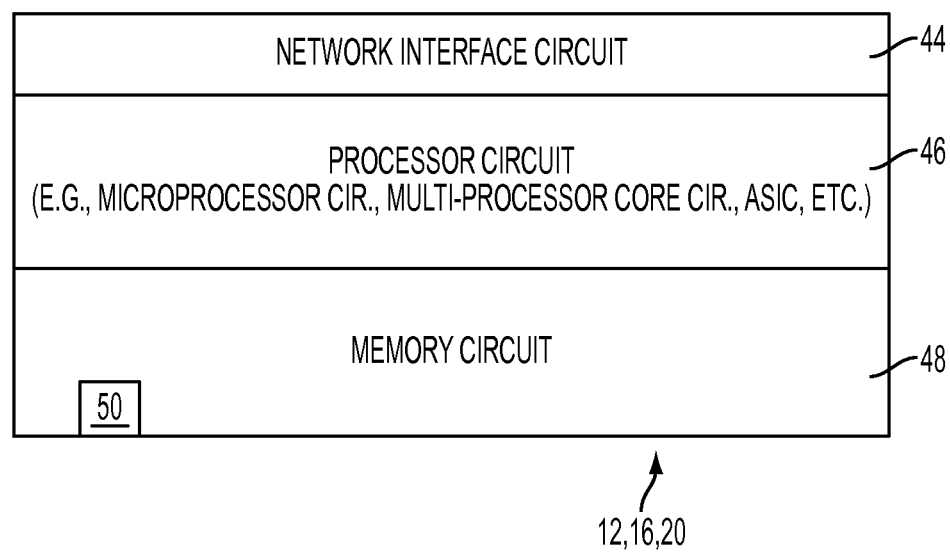
FIG. 2 illustrates in further detail the apparatus of FIG. 1, according to an example embodiment.

FIG. 2 illustrates an example implementation of any one of the devices 12 or 16, according to an example embodiment. Each apparatus 12, 16 can include a network interface circuit (i.e., a device interface circuit) 44, a processor circuit 46, and a memory circuit 48. The network interface circuit 44 can include one or more distinct physical layer transceivers, receivers/detectors, and/or transmitters for communication with any one of the other devices 12, 16, 20, and any device in the network 21. For example, the network interface circuit 44 of the apparatus 12 can include a wired IEEE based Ethernet transceiver for communications via the wireless access point 20 and/or any network element in the LAN/WAN 21; the network interface circuit 44 of the apparatus 12 also can include circuitry to cause the optical physical layer transmitter devices 18 to optically transmit distinct flows of encoded cells, for example in the form of messages via the connections 22 if the devices 18 include optical driver logic, and/or in the form of analog driver signals if directly coupled to an optical transmitter (e.g., LED or laser diode).

The network interface circuit 44 of the apparatus 16a can include a WiFi transceiver for communication with the WiFi access point 20, a wireless telephony transceiver (e.g., 4G/LTE) for communication with a wireless telephony service provider, etc. The network interface circuit 44 of the apparatus 16a also can include two or more optical receivers (32 of FIG. 1; 32a, 32b of FIG. 5) configured for receiving/detecting respective light beams 24; for example, the optical receivers can be implemented as a hemispherical "golf ball" shaped receiver (32 of FIG. 1) having two or more photodiodes (or other photosensitive detector) for receiving/detecting the respective light beams; the photodiodes in the optical receiver 32 also can be implemented in different forms, for example as an array of cosmetic jewelry, for example a strand of "pearls" with embedded photodiodes, clothing adorned with photodiodes resembling "sequins" or stud costume jewelry; other wearable items can be embedded with photodiodes, such as hats, employee badges, etc.

The processor circuit 46 can be configured for executing any of the operations described herein, and the memory circuit 48 can be configured for storing any data or data packets as described herein.

Any of the disclosed circuits of the devices 12, 16, and/or 20 (including the network interface circuit 44, the processor circuit 46, the memory circuit 48, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 48) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 48 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 48 can be implemented dynamically by the processor circuit 46, for example based on memory address assignment and partitioning executed by the processor circuit 46.

Figure 3:
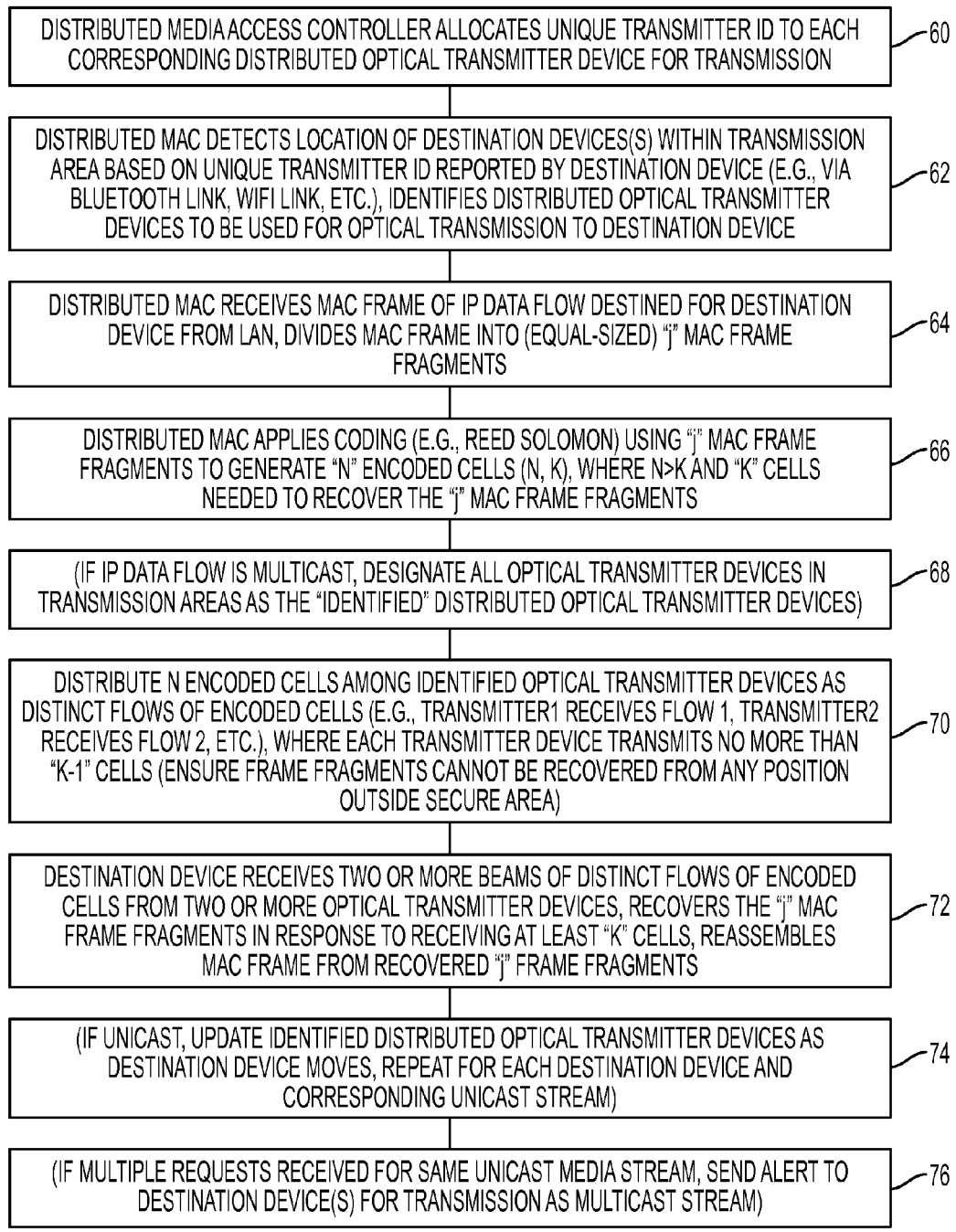
FIG. 3 illustrates an example method by the apparatus of FIG. 1 of transmitting a MAC frame as network coded cells via multiple optical transmitters, according to an example embodiment.
Figure 4:
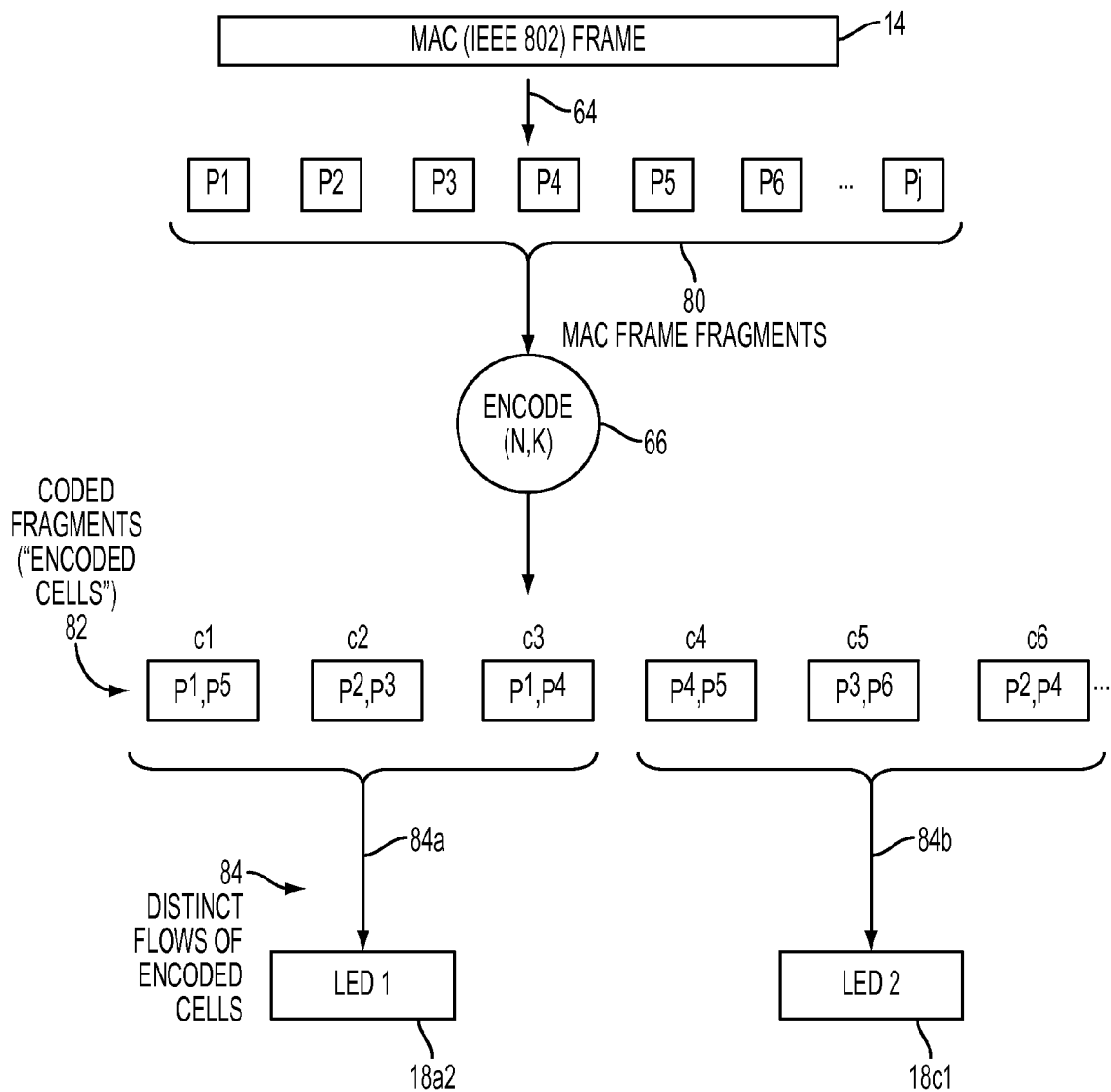
FIG. 4 illustrates the generation of network coded cells from a single MAC frame, by the apparatus of FIG. 1, for transmission as distinct flows of encoded cells via multiple optical transmitters, according to an example embodiment.
Figure 5:
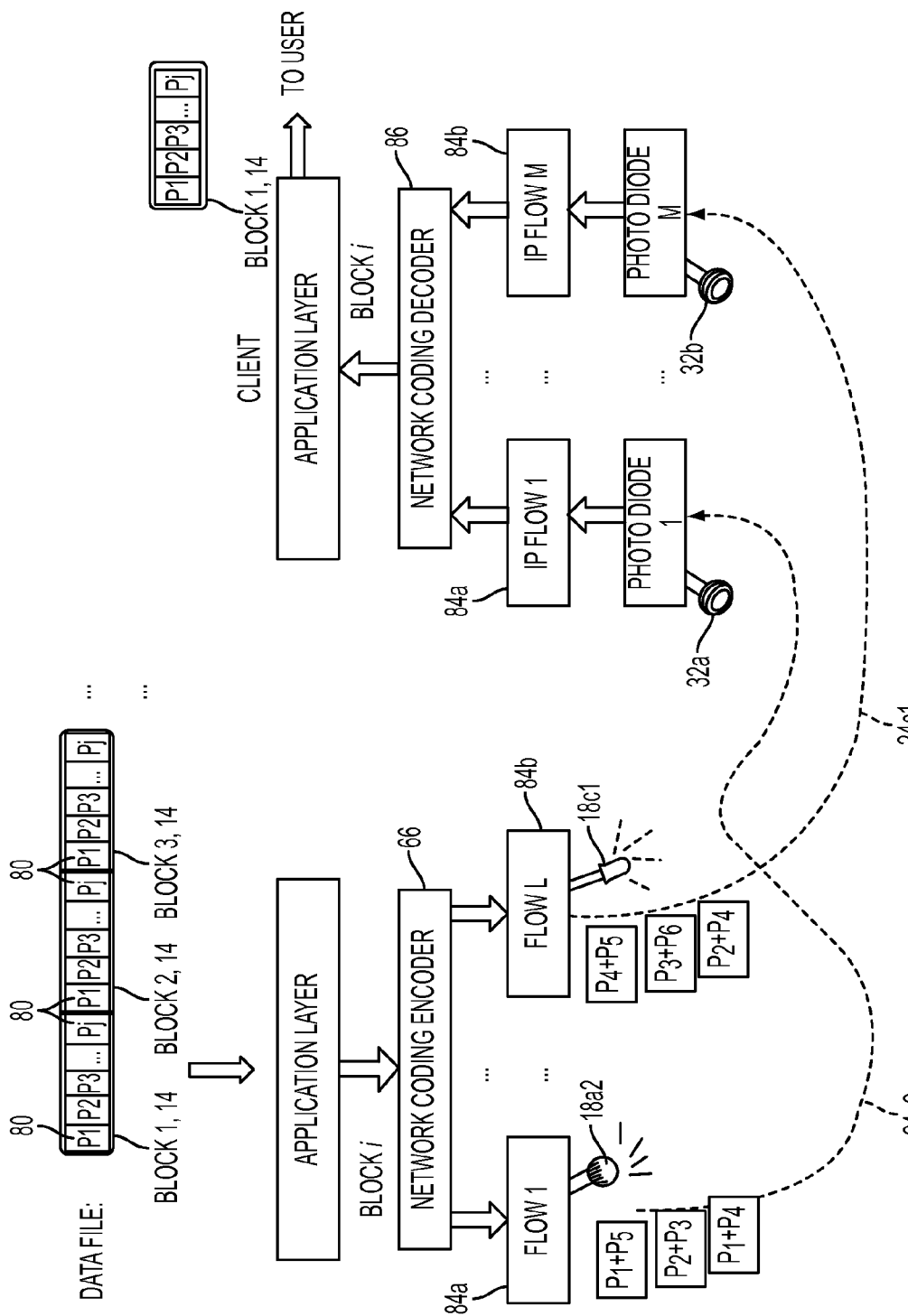
FIG. 5 illustrates in further detail the transmission of a single MAC frame as distinct flows of encoded cells via multiple optical transmitters, according to an example embodiment.

FIG. 3 illustrates an example method by the apparatus 12 of FIG. 1 of transmitting a MAC frame as network coded cells via multiple optical transmitters, according to an example embodiment. FIG. 4 illustrates the generation of network coded cells from a single MAC frame, by the apparatus of FIG. 1, for transmission as distinct flows of encoded cells via multiple optical transmitters, according to an example embodiment. FIG. 5 illustrates in further detail the transmission of a single MAC frame as distinct flows of encoded cells via multiple optical transmitters, according to an example embodiment.

The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

In addition, the operations described with respect to any of the FIGS. 1-5 can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

The apparatus 12, also referred to herein as a distributed media access controller (MAC) or distributed MAC processor, in operation 60 can allocate a unique transmitter identifier to each corresponding optical transmitter device (e.g., each LED or each laser diode); for example, during deployment of the array of optical transmitter devices 18 within a room 28, the physical topology/layout of the array of optical transmitter devices 18 can be stored in a data structure 50 in the memory circuit 48 of the apparatus 12, enabling the apparatus 12 to determine the most appropriate optical transmitter devices 18 to be used for transmitting the distinct flows of encoded cells via the respective beams 24 to a destination device 16 at a determined location within the room 28.

For example, the data structure 50 can store an "LED Attribute Table" that specifies, for each optical transmitter device 18 deployed in a given room 28, the corresponding transmitter ID, the corresponding transmission direction (e.g., North, South, East, West, Down, North and Down 45 degrees, etc.), and an identification of any destination devices (e.g., by MAC and/or IP address) 16 that can reach the optical transmitter device 18 (i.e., that can detect the corresponding beam 24 from the transmitter device 18). The "LED Attribute Table" also can identify any unsecure destination location, for example if the corresponding beam (e.g., 24a1, 24b1, 24ce, and/or 24d3) can exit a window 34 of the secure area 28; hence, the processor circuit 46 of the distributed MAC processor 12 can identify if any one of the physical layer transmitter devices 18 is capable of transmitting an optical beam 24 to one or more locations outside the secure area 28, and in response select the encoded cells to be transmitted via the corresponding optical beam 24 to ensure that any frame fragments cannot be recovered solely from a single location outside the secure area 28. The processor circuit 46 can have a stored map in the memory circuit 48 of the propagation patterns of optical beams 24 to ensure that a given location outside the secure area 28 cannot recover sufficient MAC frame fragments to reconstruct a complete MAC frame.

The processor circuit 46 of the distributed MAC processor 12 in operation 62 can detect the location of the destination devices 16a and/or 16b within the transmission area 28 based on the transmitter identifiers reported by the destination devices 16. For example, the destination device 16a can output (e.g., via WiFi link or Bluetooth link) identifiers "a2", "b2", "c1", and "d1" that were transmitted via the transmitter devices 18 via the respective beams 24a2, 24b2, 24c1, and 24d1; the destination device 16b can output identifiers "c2" and "d2" that were transmitted via the transmitter devices 18 via the respective beams 24c2 and 24d2, respectively. Hence, the processor circuit 46 in operation 62 can update the data structure 50 to specify that the destination device 16a (identified by MAC address and/or IP address) is reachable via the optical physical layer transmitter devices 18 transmitting the respective beams 24a2, 24b2, 24c1, and 24d1, and that the destination device 16b is reachable via the optical physical layer transmitter devices 18 transmitting the respective beams 24c2 and 24d2. As described below, the data structure 50 can be updated if a destination device 16 moves throughout the secure area 28, or rotates, or encounters a shadow that blocks one of the optical paths 24.

Hence, the processor circuit 46 of the distributed MAC processor 12 in operation 62 can identify the transmitter devices 18 (and optical channels, e.t., 18a1, 18a2) to be used for optical transmission to a given destination device (e.g., 16a and/or 16b).

The device interface circuit 44 of the distributed MAC processor in operation 64 can receive, from the LAN/WAN 21, a MAC frame 14 for a given Internet Protocol (IP) data flow that is destined for a destination device (e.g., 16a) identified by its MAC and/or IP address. As illustrated in detail with respect to FIG. 4, the processor circuit 46 is configured for dividing in operation 64 each MAC frame 14 into equal-sized frame fragments (e.g., P1, P2, . . . , Pj) 80, and coding (e.g., network coding) in operation 66 the frame fragments 80 into encoded cells (i.e., "coded fragments") 82. In particular, example coding techniques (e.g., Reed Solomon, exclusive-OR (XOR)) enable two or more MAC frame fragments (e.g., P1, P5) 80 to be "encoded" within a single encoded cell (e.g., "c1"), such that the "j" frame fragments 80 can be used in operation 66 to generate "N" encoded cells 82, where "N" is greater than "K" (N>K) and at least "K" encoded cells are needed to recover the "j" frame fragments 80.

The coding technique (e.g., Reed Solomon, Network Coding) in operation 66 provides a forward error correction (FEC) mechanism which provides a property referred to as Maximum Distance Separable (MDS). In particular, the encoding technique in operation 66 insures that if "K" (out of N) encoded cells 82 are received, then the MAC frame fragments 80 can be recovered, regardless of which specific cells (c1, c2, . . . cN) are received. Hence, a unique encoded fragment 82 can repair any one MAC frame fragment 80, such that any different linear combinations of "K" cells 82 can be decoded (by the processor circuit 46) in the destination device 16 to obtain the original MAC frame fragments 80.

The processor circuit 46 can select a subset of the encoded cells 82 for transmission as a distinct flow 84 of encoded cells 82 by a corresponding optical physical layer transmitter device 18. The selection of a subset of encoded cells 82 for a distinct flow 84 can be applied for unicast and/or multicast streams. The processor circuit 46 can determine for multicast streams in operation 68 that all optical transmitter devices 18 within the secure area 28 should be identified for transmitting one of the distinct flows 84 of encoded cells 82, for example to provide full coverage of a multicast media stream within the secure area 28, so long that each transmitter device transmits no more than "K−1" encoded cells 82 to ensure security such that frame fragments 80 cannot be recovered from any position outside the secure area 28 (e.g., outside the window 34).

Assuming the MAC frame 14 is part of a unicast data flow for a destination device 16a, the processor circuit 46 in operation 70 can distribute the "N" encoded cells 82 among the identified optical transmitter devices (e.g., 18a2, 18c1) as distinct flows 84 of the encoded cells 82. As illustrated in FIGS. 4 and 5, the processor circuit 46 can select the first subset of cells "c1", "c2" and "c3" for the distinct flow 84a output by the optical physical layer transmitter device 18a2, and the second subset of cells "c4", "c5", and "c6" for the second distinct flow 84b output by the optical physical layer transmitter device 18c1. As illustrated in FIGS. 4 and 5, the encoded cell "c1" 82 is encoded based on the frame fragments "P1" and "P5" 80, the encoded cell "c2" 82 is encoded based on the frame fragments "P2" and "P3" 80, the encoded cell "c3" is encoded based on the frame fragments "P1", "P4", etc.

The processor circuit 46 in operation 70 ensures that each distinct flow 84 includes less than the number "K" of encoded cells 82 that are needed to decode the MAC frame fragments 80 to ensure the destination device 16 cannot recover the frame fragments from a single distinct flow 84; hence, the frame fragments 80 cannot be recovered from any position outside the secure area 28 (e.g., in the event that a beam 24 travels out of a window 34). Further, the processor circuit 46 in operation 70 ensures that the distinct flows 84 for the unicast streams are not sent to any physical layer transmitter device 18 that is not reachable by the destination device 16.

As illustrated in FIG. 5, network interface circuit 44 of the destination device (e.g. 16a) in operation 72 can receive two or more beams 24 (e.g., 24a2, 24c1) carrying respective distinct flows (e.g., 84a, 84b) of the encoded cells 82, as detected by the photodiodes 32a, 32b, respectively. The processor circuit 46 of the destination device 16 can execute a decoder 86 to recover the "j" MAC frame fragments 80 in response to receiving at least "K" cells 82 from the two or more flows 84 transmitted by the respective beams 24. The processor circuit 46 of the destination device 16 can reassemble the MAC frame 14 from the recovered frame fragments 80 for delivery to the relevant client application 88.

Various optimizations can be implemented by the processor circuit 46 executed by the distributed MAC processor 12. For example, the processor circuit 46 in operation 74 can update the corresponding listing of identified distributed optical transmitter devices in the data structure 50 as the corresponding destination device 16a moves (e.g., based on receiving an updated list of transmitter identifiers via the wireless access point 20); the processor circuit can repeat the updating in operation 74 for each destination device 16.

The processor circuit 46 executed by the distributed MAC processor in operation 76 also can send an instruction to a destination device 16a, for changing from reception of a requested unicast data stream to reception of the requested unicast data stream as a multicast stream, for example to avoid multiple unicast transmissions of the same media stream. Hence, processor circuit 46 can individually control each and every optical physical layer transmitter device 84, including the allocation of flows 84 of encoded cells 82. Consequently, the processor circuit 46 can distribute multiple streams within a secure area, including a first group of flows (e.g., 84a, 84b) among all physical layer transmitter devices 18 in the secure area 28 for a first multicast stream, a second group of flows (e.g., 84a', 84b') among a first selected subset of transmitters 18 reachable by a second destination device 16 for a second unicast data stream, and a third group if flows (e.g., 84a", 84b") among a second selected subset of transmitters 18 reachable by a third destination device 16 for a third unicast data stream.

According to example embodiments, coding can be implemented to MAC frame fragments to provide a distributed MAC architecture that can transmit network coded cells via distributed optical transmitters. The distributed MAC architecture enables orders of magnitude increase in bandwidth capacity relative to existing RF wireless protocols. The example embodiments are resilient to changes in optical alignments and optical path obstructions due to the available of coded cells from multiple optical paths, while maintaining security to prevent unauthorized detection.

Although the distributed MAC processor 12 is described with respect to transmit operations and the destination device 12 is described with respect to receive operations, it will become readily apparent that the disclosed transmit and receive operations can be incorporated within a single fixed or portable apparatus.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   receiving, by an apparatus, a Media Access Control (MAC) frame destined for a destination device;
   dividing, by the apparatus, the MAC frame into frame fragments;
   coding the frame fragments into encoded cells; and
   causing, by the apparatus, transmission of selected subsets of the encoded cells, as distinct flows of the encoded cells, by respective optical physical layer transmitter devices reachable by the destination device.

2. The method of claim 1, wherein a first number of any of the encoded cells are required for recovering the frame fragments of the MAC frame, the causing including:
   identifying the physical layer transmitter devices reachable by the destination device from among a plurality of physical layer transmitter devices; and
   sending the distinct flows to the respective physical layer transmitter devices identified as reachable by the destination device, and not to any physical layer transmitter devices in the array that are not reachable by the destination device.

3. The method of claim 2, wherein the coding of the frame fragments includes network coding the frame fragments into the encoded cells, and each distinct flow includes less than the first number of the encoded cells, wherein the destination device cannot recover the frame fragments solely from a single one of the distinct flows of the encoded cells.

4. The method of claim 2, wherein:
   the physical layer transmitter devices are positioned in a secure area, at least one of the physical layer transmitter devices capable of transmitting an optical beam to one or more locations outside the secure area;
   the causing including selecting the encoded cells for the distinct flows wherein the frame fragments cannot be recovered solely from a single location outside the secure area.

5. The method of claim 2, the causing further including changing the identification of the physical layer transmitter devices reachable by the destination device based on a detected movement of the destination device.

6. The method of claim 1, further comprising the apparatus sending an instruction to the destination device, via the physical layer transmitter devices, for changing from reception of a requested unicast data stream to reception of the requested unicast data stream as a multicast stream.

7. The method of claim 6, further comprising:
   distributing the distinct flows of the encoded cells for the MAC frame as part of the multicast stream among all physical layer transmitter devices within a secure area;
   distributing the distinct flows for a second MAC frame associated with a second unicast data stream for a second destination device to a first subset of the physical layer transmitter devices identified as reachable by a second destination device; and
   distributing the distinct flows for a third MAC frame associated with a third unicast data stream for a third destination device to a second subset of the physical layer transmitter devices identified as reachable by the third destination device.

8. An apparatus comprising:
   a network interface circuit configured for receiving a Media Access Control (MAC) frame destined for a destination device; and
   a processor circuit configured for dividing the MAC frame into frame fragments, coding the frame fragments into encoded cells, and causing transmission of selected subsets of the encoded cells, as distinct flows of the encoded cells, by respective optical physical layer transmitter devices reachable by the destination device.

9. The apparatus of claim 8, wherein a first number of any of the encoded cells are required for recovering the frame fragments of the MAC frame, the processor circuit further configured for:
   identifying the physical layer transmitter devices reachable by the destination device from among a plurality of physical layer transmitter devices; and
   sending the distinct flows to the respective physical layer transmitter devices identified as reachable by the destination device, and not to any physical layer transmitter devices that are not reachable by the destination device.

10. The apparatus of claim 9, wherein the processor circuit further configured for:
    coding the frame fragments based on network coding the frame fragments into the encoded cells;
    selecting the subsets of the encoded cells such that each distinct flow includes less than the first number of the encoded cells, wherein the destination device cannot recover the frame fragments solely from a single one of the distinct flows of the encoded cells.

11. The apparatus of claim 9, wherein:
the physical layer transmitter devices are positioned in a secure area, at least one of the physical layer transmitter devices capable of transmitting an optical beam to one or more locations outside the secure area;
the processor circuit configured for selecting the encoded cells for the distinct flows wherein the frame fragments cannot be recovered solely from a single location outside the secure area.

12. The apparatus of claim 9, the processor circuit further configured for changing the identification of the physical layer transmitter devices reachable by the destination device based on a detected movement of the destination device.

13. The apparatus of claim 8, the processor circuit further configured for sending an instruction to the destination device, via the physical layer transmitter devices, for changing from reception of a requested unicast data stream to reception of the requested unicast data stream as a multicast stream.

14. The apparatus of claim 13, the processor circuit further configured for:
distributing the distinct flows of the encoded cells for the MAC frame as part of the multicast stream among all physical layer transmitter devices positioned within a secure area;
distributing the distinct flows for a second MAC frame associated with a second unicast data stream for a second destination device to a first subset of the physical layer transmitter devices identified as reachable by a second destination device; and
distributing the distinct flows for a third MAC frame associated with a third unicast data stream for a third destination device to a second subset of the physical layer transmitter devices identified as reachable by the third destination device.

15. Logic encoded in one or more non-transitory tangible media for execution by a machine and when executed by the machine operable for:
receiving, by the machine, a Media Access Control (MAC) frame destined for a destination device;
dividing, by the machine, the MAC frame into frame fragments;
coding the frame fragments into encoded cells; and
causing, by the machine, transmission of selected subsets of the encoded cells, as distinct flows of the encoded cells, by respective optical physical layer transmitter devices reachable by the destination device.

16. The logic of claim 15, wherein a first number of any of the encoded cells are required for recovering the frame fragments of the MAC frame, the causing including:
identifying the physical layer transmitter devices reachable by the destination device from among a plurality of physical layer transmitter devices; and
sending the distinct flows to the respective physical layer transmitter devices identified as reachable by the destination device, and not to any physical layer transmitter devices that are not reachable by the destination device.

17. The logic of claim 16, wherein the coding of the frame fragments includes network coding the frame fragments into the encoded cells, and each distinct flow includes less than the first number of the encoded cells, wherein the destination device cannot recover the frame fragments solely from a single one of the distinct flows of the encoded cells.

18. The logic of claim 16, the causing further including changing the identification of the physical layer transmitter devices reachable by the destination device based a detected movement of the destination device.

19. An apparatus comprising:
a device interface circuit configured for receiving at least first and second optical beams transmitting respective distinct flows of encoded cells for a Media Access Control (MAC) frame; and
a processor circuit configured for decoding, from the distinct flows of encoded cells, a plurality of MAC frame fragments, and assembling the MAC frame from the frame fragments, wherein:
a first number of any of the encoded cells are required for recovering the frame fragments of the MAC frame;
the flow of encoded cells transmitted by the first optical beam as a first flow contains less than the first number of the encoded cells;
the flow of encoded cells transmitted by the second optical beam as a second flow contains less than the first number of the encoded cells, the second flow containing encoded cells that are different than the first flow, the processor circuit requiring encoded cells from the first flow and the second flow to assemble the MAC frame.

20. The apparatus of claim 19, wherein the device interface circuit comprises two or more directional receivers for receiving the at least first and second optical beams, respectively.

\* \* \* \* \*